United States Patent
Sugawara

(12) 
(10) Patent No.: US 6,567,723 B2
(45) Date of Patent: May 20, 2003

(54) PROGRAM EXECUTING METHOD, SYSTEM AND PROGRAM PROCESSING UNIT FOR ROBOT

(75) Inventor: Tomoyoshi Sugawara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/058,926

(22) Filed: Jan. 30, 2002

(65) Prior Publication Data

US 2002/0103575 A1 Aug. 1, 2002

(30) Foreign Application Priority Data

Jan. 30, 2001 (JP) ...................................... 2001-022297
Jan. 24, 2002 (JP) ...................................... 2002-015980

(51) Int. Cl.⁷ ............................................ G06F 19/00
(52) U.S. Cl. ...................... 700/245; 700/247; 700/249; 700/255; 700/257; 700/259; 700/23; 700/24; 318/568.1; 318/568.13; 318/568.14; 318/568.16; 901/2; 901/4; 901/8; 901/9; 901/30
(58) Field of Search .................. 700/254, 174, 700/251, 259, 257, 247, 249, 255, 264; 318/568.13, 568.14, 568.16, 568.21, 568.23, 568.1, 573; 901/2, 4, 8, 9, 30, 32, 42, 46, 47; 701/2, 24, 23; 702/41, 81; 219/24.34

(56) References Cited

U.S. PATENT DOCUMENTS

| | | | | |
|---|---|---|---|---|
| 4,616,121 A | * | 10/1986 | Clocksin et al. | 219/124.34 |
| 4,663,726 A | * | 5/1987 | Chand et al. | 700/252 |
| 4,835,730 A | * | 5/1989 | Shimano et al. | 700/257 |
| 4,855,923 A | * | 8/1989 | Fullmer | 700/108 |
| 5,555,179 A | * | 9/1996 | Koyama et al. | 700/95 |
| 5,798,627 A | * | 8/1998 | Gilliland et al. | 318/568.14 |
| 6,282,460 B2 | * | 8/2001 | Gilliland et al. | 700/255 |
| 6,289,264 B1 | * | 9/2001 | Zenke | 700/245 |
| 6,345,213 B1 | * | 2/2002 | Graeser et al. | 700/245 |

FOREIGN PATENT DOCUMENTS

| | | |
|---|---|---|
| JP | 6-328379 | 11/1994 |
| JP | 11-77580 | 3/1999 |

OTHER PUBLICATIONS

Budenske, Sensor expication: Knowledge–based robotic plan execution through logical objects, 1997, IEEE, pp. 611–625.*

Li Gong, Sun Microsystems, "Java 2 Platform Security Architecture", Version 1.0, Oct. 2, 1998, pp. i–64.

* cited by examiner

Primary Examiner—William A Cuchlinski, Jr.
Assistant Examiner—McDievnel Marc
(74) Attorney, Agent, or Firm—McGinn & Gibb, PLLC

(57) ABSTRACT

A method, system and program processing unit for a robot, by which the safety during execution of a program is improved. The program processing unit comprises a program interpreter, a command rejection device and a command execution device. When the program interpreter sends a command in a program to the command rejection device, the command rejection device searches a command rejection rule storage section for a command rejection rule corresponding to the command, and if the rule is detected, retlieves input values from one or more sensors and the source information of the program from a source information storage section, judges command rejection conditions included in the rule based on the sensor information, source information, the command and its parameters, dismisses the command when the conditions are met, and sends the command to the command execution device when the conditions are not met.

9 Claims, 14 Drawing Sheets

F I G. 4

INPUT FROM ULTRASONIC RANGE SENSOR U1 right 200cm, left 50cm, forward 20cm, backward 200cm

SOURCE INFORMATION FILE J1

Find a Person, FTP, TOM ------- j11
Dance, Mail, NEC ------- j12

(EXTENDED) PROGRAM P1

```
if (multidirectional microphone == right)
    rotate (30-degree, 10-degree/s):           ------- C1
:
if (multidirectional microphone == forward)
    if (CCD camera == human)
        move (30cm, 10cm/s) :                  ------- C2
:
if (multidirectional microphone == backward)
    if (CCD camera == human)
        move (30cm, -10cm/s) :                 ------- C3
:
if (microphone == "TVpower on")
    TVpower ;                                  ------- C4
```

COMMAND REJECTION RULE FILE R1 move, programmer != NEC && ultrasonic range sensor (forward) < 50cm && parameter 2 > 0cm/s   ---- R11
move, programmer != NEC && ultrasonic range sensor (backward) < 50cm && parameter 2 < 0cm/s  ---- R12

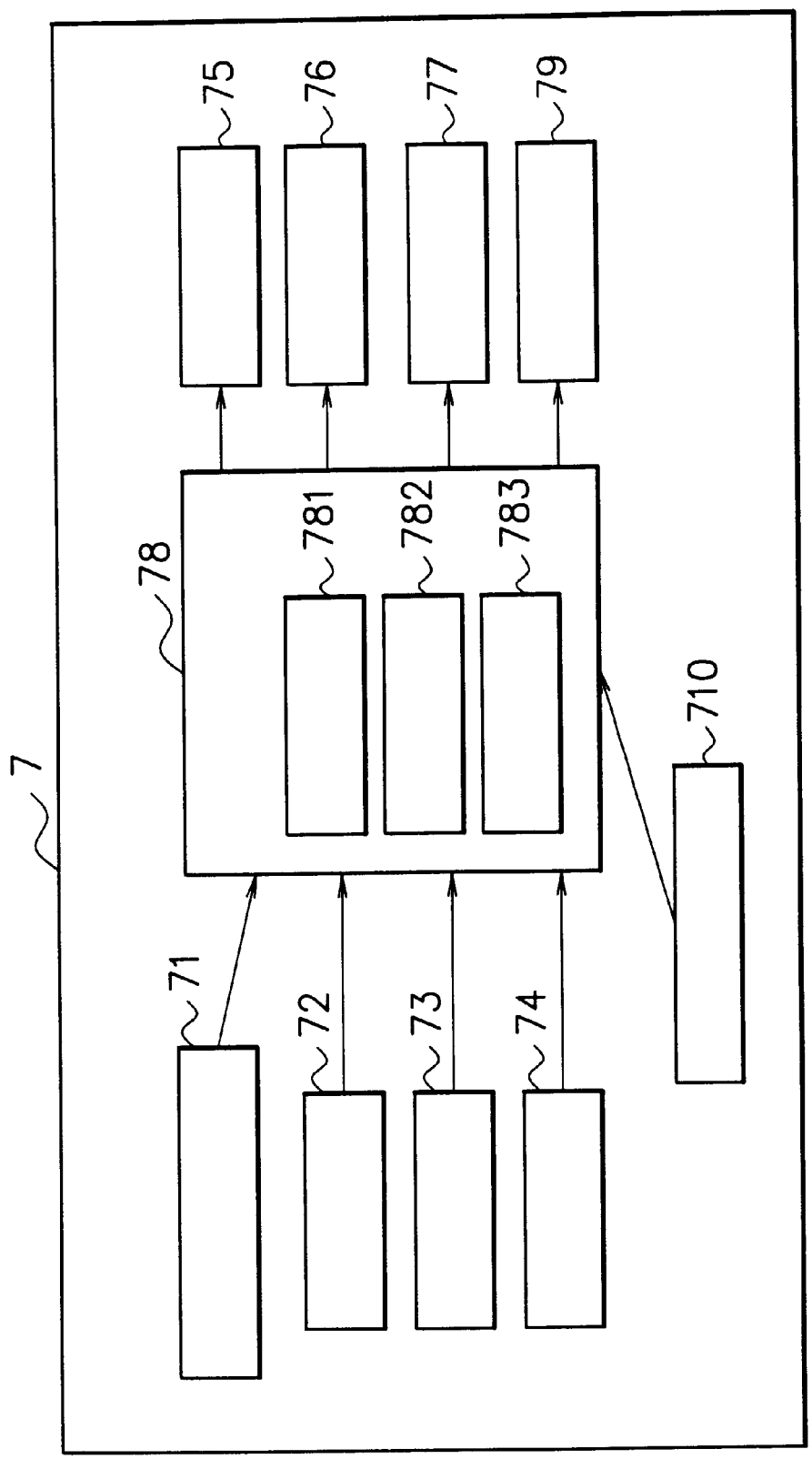

FIG. 8

EXECUTION HISTORY FILE H1

| | |
|---|---|
| 2000.1.1.14:01:10. TVpower | ---- H11 |
| 2000.1.1.14:01:08. TVpower | ---- H12 |
| 2000.1.1.14:01:06. TVpower | ---- H13 |
| 2000.1.1.14:01:02. move (30cm, 10cm/s) | ---- H14 |
| 2000.1.1.14:01:00. TVpower | ---- H15 |
| 2000.1.1.14:00:50. TVpower | ---- H16 |

SOURCE INFORMATION FILE J1

| | |
|---|---|
| Find a Person, FTP, TOM | ---- J11 |
| Dance, Mail, NEC | ---- J12 |

COMMAND REJECTION RULE FILE R2

| | |
|---|---|
| rotate, programmer != NEC && count (rotate, 10 seconds) >= 10 | ---- R21 |
| TVpower, programmer != NEC && count (TVpower, 10 seconds) >= 8 | ---- R22 |

(EXTENDED) PROGRAM P1

```
:
if (multidirectional microphone == right)                   ---- C1
  rotate (30-degree, 10-degree/s) :
:
if (multidirectional microphone == forward)                 ---- C2
  if (CCD camera == human)
    move (30cm, 10cm/s) :
if (multidirectional microphone == backward)                ---- C3
  if (CCD camera == human)
    move (30cm, -10cm/s) :
....
if (microphone == " TVpower on ")                           ---- C4
  TVpower :
```

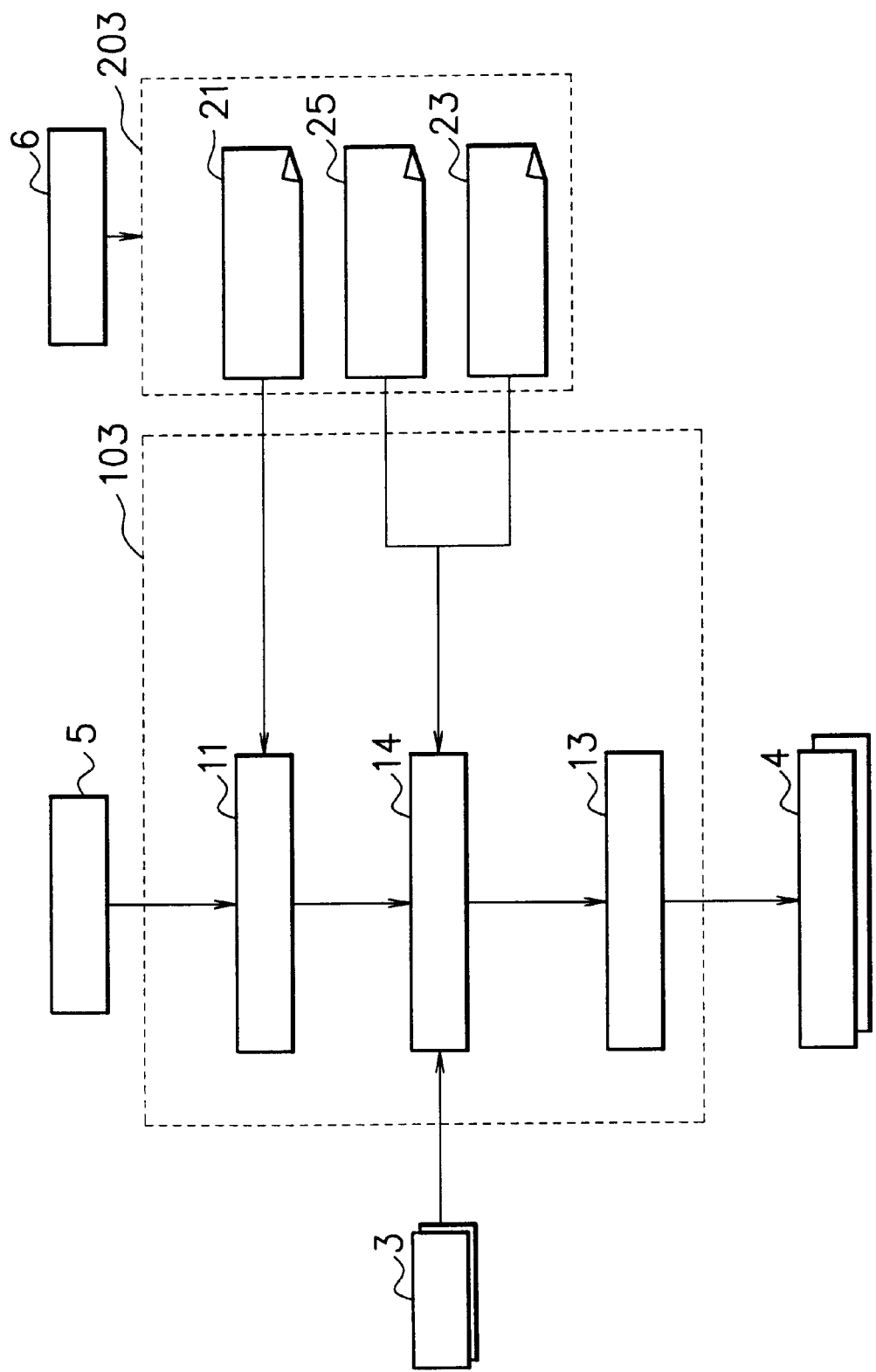

FIG. 11

INPUT FROM ULTRASONIC RANGE SENSOR U1 right 200cm, left 50cm, forward 20cm, backward 200cm

SOURCE INFORMATION FILE J1

Find a Person, FTP, TOM — J11
Dance, Mail, NEC — J12

(EXTENDED) PROGRAM P1

```
if (multidirectional microphone == right)                    ----- C1
    rotate (30-degree, 10-degree/s) :
...
if (multidirectional microphone == forward) :                ----- C2
    if (CCD camera == human)
        move (30cm, 10cm/s) :
...
if (multidirectional microphone == backward)                 ----- C3
    if (CCD camera == human)
        move (30cm, -10cm/s) :
...
if (microphone == "TVpower on")                              ----- C4
    TVpower :
```

COMMAND CHANGE RULE FILE R3 move, programmer ! = NEC && ultrasonic range sensor (foward) < 50cm && parameter 2 > 5cm/s, move (parameter 1,5cm/s) --- R31
rotate, programmer ! = NEC && ultrasonic range sensor (foward) < 50cm, speech ("robot rotate")  --- R32

PROGRAM EXECUTING METHOD, SYSTEM AND PROGRAM PROCESSING UNIT FOR ROBOT

BACKGROUND OF THE INVENTION

The present invention relates to a program executing method, system and program processing unit for a robot, and in particular, to a program executing method, system and program processing unit for a robot, which controls execution of programs according to its external environment and internal state.

Description of the Related Art

Conventionally, a robot control unit has been provided with security features to protect a robot and a user who operates the robot. There is described in Japanese Patent Application Laid-Open No. HEI11-77580 an example of the robot control unit having a built-in safety device. The robot control unit detects an overload in the operation of a robot, and stops a motor if the robot is overloaded. Herewith the robot control unit assures the safety of the operator as well as preventing damage when the robot collides with an outside machine.

However, the security features are completely incorporated as part of the robot control unit, and thus the entire robot control unit needs to be changed in case of any changes in the security features.

A robot control unit that solves the above problem in part is described in Japanese Patent Application Laid-Open No. HEI6-328379. The robot control unit is equipped with not security features but a motion correcting means for switching operation mode according to sensor information. FIG. 1(a) is a block diagram showing a configuration of the robot control unit. In the robot control unit, a condition monitoring section 822 decides a current operation state based on the information obtained through a sensor 84, and accordingly, an operation selecting section 823 switches operation mode by selecting one of operation correcting modules 8241 to 8243. The condition monitoring section 822 generates an event that indicates the current operation state based on the corresponding relation between a sensor value and an event value shown in FIG. 1(b). The operation selecting section 823 switches operation mode based on a state transition chart shown in FIG. 1(c). That is, when the sensor value f is less than or equal to a certain threshold F, event Ev1 is issued from the condition monitoring section 822. Subsequently, the operation selecting section 823 selects a running condition mode, and thus selects the operation correcting module of running condition. When the sensor value f is more than the threshold F, event Ev2 is issued from the condition monitoring section 822. In this case, the operation selecting section 823 selects a deburring condition mode, and the operation correcting module of deburring condition. The features of the safety device in the above-mentioned robot control unit can be implemented by using the motion correcting means. Moreover, since rules and modules for correcting operations are modularized, it is easy to modify security features compared to the above robot control unit.

In addition, there is a Java application environment as a program processing unit for a computer, although not for a robot. In document "Java 2 Platform Security Architecture" (Li Gong, Sun Microsystems), the latest Java technology, Java 2 security architecture, is described. According to the Java 2, it is possible to set limits to the object (file, network, etc.) and operation (reading, writing, etc.) of a program depending on the programmer and location of the program by rules called security policy. The security policy may be stored as a text file or binary data separately from the Java application environment. Therefore, the security policy alone can be changed without replacing the whole Java application environment.

However, in the security features of the conventional program processing unit, it is pointed out as the first problem that addition and modification of rules for restricting operations are difficult. This is because occurrence conditions of events that trigger state transition and rules for state transition are incorporated in the condition monitoring section and the operation selecting section, respectively, and only the rules cannot be simply changed. Besides, in the security features of the Java application environment, it is possible to modify the rules, but the rules concern about only programmers and locations. Additionally, there is no device or mechanism to use sensor information and the like.

The second problem is that in the security features of the conventional program processing unit, rules are poorly expressed and described. The description method or mechanism provided for the security features of the conventional robot control unit and also the Java application environment is too simple to describe the rule for synthetic judgment on the occasion of having a great deal of sensor and internal state information.

For example, a general-purpose robot is required to read programs from the outside and perform various operations. In such robot, it is necessary to test security through consolidating information about the programmer and location of a program, sensor information, and the internal state of the robot. Consequently, the robot needs a mechanism to describe rules for the security test by using the information in a comprehensive manner. Thus those inflexible in describing the rule such as the conventional robot control unit and the Java application environment are presumably inadequate.

SUMMARY OF THE INVENTION

It is therefore an object of the present invention to provide a program executing method and a program processing unit for a robot, in which execution of a program is controlled by using all available information such as the programmer and location of the program, sensor information and the internal state of a system to provide an operation mode suitable for execution environment of the program, and thus the safety of a robot and its operator is improved in execution of the program.

It is another object of the present invention to provide a program executing method and a program processing unit for a robot, in which, when execution of a program is controlled by using all available information such as the programmer and location of the program, sensor information and the internal state of a system, the safety in execution of the program is tested through consolidating many conditions, and the power of expressing and describing rules for the test is improved.

In accordance with the first aspect of the present invention, there is provided an robot program executing method comprising a command unit for issuing a command to a robot, a storage for storing information, an input unit for inputting information from the outside to the storage, a processing unit for executing a program, and an actuator that operates with a control signal from the processing unit, wherein: the processing unit includes a program processing unit for executing a program inputted from the outside; the program includes a command for actuating the actuator; the command may include one or more parameter(s) for designating the speed, distance and/or count; the storage includes at least an area for storing the program, an area for storing command rejection rules for rejecting execution of commands and/or command change rules for changing commands, and an area for storing source information of the program; the command rejection rule includes a command to be rejected and conditions for judging whether or not to reject the command; the command change rule includes a command to be replaced or modified, conditions for judging whether or not to change the command, and an alternative command; and the conditions may include conditions concerning the source information of the program, the command and parameter(s). In addition, for executing a command in the program, the robot program executing method comprises the steps of searching for a command rejection rule and/or command change rule corresponding to the command; if detected, retrieving the source information of the active program from the storage; judging conditions included in the command rejection rule and/or command change rule; dismissing the command or changing at least a part of the command when the conditions are satisfied; and executing the command when the conditions are not satisfied.

In accordance with the second aspect of the present invention, in the first aspect, the robot program executing method further comprises one or more sensor(s) for obtaining conditions outside the program processing unit and/or conditions of the unit itself, wherein the conditions may further include conditions concerning information inputted from the sensor(s). For executing a command in the program, the robot program executing method comprises the steps of: searching for a command rejection rule and/or command change rule corresponding to the command; if detected, retrieving the source information and sensor information; judging conditions included in the command rejection rule and/or command change rule using the information; dismissing the command or changing at least a part of the command when the conditions are satisfied; and executing the command when the conditions are not satisfied.

In accordance with the third aspect of the present invention, in the first and second aspects, the storage further includes an area for storing command execution history, wherein the conditions may further include conditions concerning the command execution history. For executing a command in the program, the robot program executing method comprises the steps of: searching for a command rejection rule and/or command change rule corresponding to the command; if detected, retrieving at least one selected from the source information, senor information and command execution history from the storage; judging conditions included in the command rejection rule and/or command change rule using the information; dismissing the command or changing at least a part of the command when the conditions are satisfied; and executing the command when the conditions are not satisfied.

In accordance with the fourth aspect of the present invention, there is provided an robot system comprising a command unit for issuing a command to a robot, a storage for storing information, an input unit for inputting information from the outside to the storage, a processing unit for executing a program, and an actuator that operates with a control signal from the processing unit, wherein: the processing unit includes a program processing unit for executing a program inputted from the outside; the program includes a command for the actuator; the command may include one or more parameter(s) for designating the speed, distance and/or count; the storage includes at least an area for storing the program, an area for storing command rejection rules for rejecting execution of commands and/or command change rules for changing commands, and an area for storing source information of the program; the command rejection rule includes a command to be rejected and conditions for judging whether or not to reject the command; the command change rule includes a command to be replaced or modified, conditions for judging whether or not to change the command, and an alternative command; and the conditions include at least one selected from conditions concerning source information of the program, the command and parameter(s). In addition, for executing a command in the program, the robot system searches for a command rejection rule and/or command change rule corresponding to the command; if detected, retrieves the source information of the active program from the storage; judges conditions included in the command rejection rule and/or command change rule based on the source information; dismisses the command or executes the alternative command in the command change rule when the conditions are satisfied; and executes the command when the conditions are not satisfied.

In accordance with the fifth aspect of the present invention, there is provided a program processing unit comprising a command unit for issuing a command to a robot, a storage for storing information, an input unit for inputting information from the outside to the storage, a processing unit for executing a program, and an actuator that operates with a control signal from the processing unit, wherein: the processing unit includes a program interpreter for reading a program from the storage and extracting commands; a command rejection means for judging whether or not to reject a command and dismissing the command when it is determined to be rejected, and/or command change means for judging whether or not to change a command and replacing at least a part of the command by an alternative command when it is determined to be changed; a command execution means for executing the command or alternative command. The command rejection means and/or command change means searches for a command rejection rule including at least conditions for judging whether or not to reject the command and/or command change rule including conditions for judging whether or not to change the command and the alternative command for replacing at least a part of the command corresponding to the command; if detected, retrieves source information of the active program from the storage; judges conditions included in the command rejection rule and/or command change rule using the source information; dismisses the command or sends the alternative command in the command change rule to the command execution means when the conditions are satisfied; and sends the command to the command execution means when the conditions are not satisfied.

In accordance with the sixth aspect of the present invention, in the fifth aspect, the program processing unit further comprises one or more sensor(s) for obtaining conditions outside the program processing unit and/or conditions of the unit itself. For executing a command in the program, the command rejection means and/or command change means searches for a command rejection rule and/or command change rule corresponding to the command, and if detected, retrieves the source information and input value from the sensor(s).

In accordance with the seventh aspect of the present invention, in the fifth and sixth aspects, the storage further includes an area for storing command execution history, wherein the command rejection means and/or command change means searches for a command rejection rule and/or command change rule corresponding to the command, and if detected, retrieves at least one selected from the source information, sensor information and corresponding command execution history.

In other words, a program processing unit according to the present invention determines whether or not to execute the command to actuate the actuator based on the input value from the sensor, the source information of the program and predetermined rules, and as a result, executes the command or dismisses it. More specifically, in the program processing unit, the command rejection means (FIG. 2, 12) obtains a command rejection rule (FIG. 2, 22) corresponding to a command sent from the program interpreter, judges rejection conditions of the rejection rule based on the input value from the sensor, the source information (FIG. 2, 23), the command and parameters of the command, dismisses the command when the rejection conditions are met, and sends the command to the command execution means when the conditions are not met.

Incidentally, the command rejection rule includes a command to be rejected and rejection conditions for determining whether or not to reject the command. The rejection conditions may include conditions concerning the parameter(s) of the command, the source information of the program, and the input value from the sensor.

In addition, the command rejection means searches for a command rejection rule corresponding to a command sent from the program interpreter, and when corresponding one is detected, retrieves the source information and the sensor input value for judging rejection conditions of the rejection rule. If the rejection conditions are met, the command is dismissed. If not, or no corresponding rule exists, the command is sent to the command execution means.

Another program processing unit according to the present invention determines whether or not to execute the command to actuate the actuator based on the command execution history, the source information of the program and predetermined rules, and as a result, executes the command or dismisses it. More specifically, in the program processing unit, the second command rejection means (FIG. 6, 122) obtains a second command rejection rule (FIG. 6, 222) corresponding to a command sent from the program interpreter, judges rejection conditions of the rejection rule based on the command execution history (FIG. 6, 24), the source information (FIG. 6, 23), the command and parameters of the command, dismisses the command when the rejection conditions are met, and sends the command to the command execution means when the conditions are not met.

Incidentally, the second command rejection rule includes a command to be rejected and rejection conditions for determining whether or not to reject the command. The rejection conditions may include conditions concerning the parameter(s) of the command, the source information of the program, and the command execution history.

In addition, the second command rejection means searches for a command rejection rule corresponding to a command sent from the program interpreter, and when corresponding one is detected, retrieves the source information and the command execution history for judging rejection conditions of the rejection rule. If the rejection conditions are met, the command is dismissed. If not, or no corresponding rule exists, the command is sent to the command execution means.

Another program processing unit according to the present invention determines whether or not to execute the command to actuate the actuator based on the input value from the sensor, the source information of the program and predetermined rules, and as a result, executes the command or an alternative command. More specifically, in the program processing unit, the command change means (FIG. 9, 14) obtains a command change rule (FIG. 9, 25) including a command to be changed, change conditions for determining whether or not to change the command, and an alternative command, judges the change conditions based on the input value from the sensor, the source information (FIG. 9, 23), the command and parameters of the command, sends the alternative command to the command execution means when the change conditions are met, and sends the command to the command execution means when the conditions are not met.

Incidentally, the command change rule includes a command to be changed, change conditions for determining whether or not to change the command, and an alternative command. The change conditions include the same conditions as the first command rejection rule.

In addition, the command change means searches for a command change rule corresponding to a command sent from the program interpreter, and when corresponding one is detected, retrieves the source information and the sensor input value for judging change conditions of the change rule. If the change conditions are met, the alternative command is executed. If not, or no corresponding rule exists, the command is sent to the command execution means.

Another program processing unit according to the present invention determines whether or not to execute the command to actuate the actuator based on the command execution history, the source information of the program and predetermined rules, and as a result, executes the command or an alternative command. More specifically, in the program processing unit, the second command change means obtains a second command change rule including a command to be changed, change conditions for determining whether or not to change the command, and an alternative command, judges the change conditions based on the command execution history, the source information, the command and parameters of the command, sends the alternative command to the command execution means when the change conditions are met, and sends the command to the command execution means when the conditions are not met.

Incidentally, the second command change rule includes a command to be changed, change conditions for determining whether or not to change the command, and an alternative command. The change conditions include the same conditions as the second command rejection rule.

In addition, the second command change means searches for a command change rule corresponding to a command sent from the program interpreter, and when corresponding one is detected, retrieves the source information and the command execution history for judging change conditions of the change rule. If the change conditions are met, the alternative command is executed. If not, or no corresponding rule exists, the command is sent to the command execution means.

BRIEF DESCRIPTION OF THE DRAWINGS

The objects and features of the present invention will become more apparent from the consideration of the following detailed description taken in conjunction with the accompanying drawings in which:

FIG. 4 is a diagram illustrating the program processing unit of the first embodiment;

FIG. 5 is a block diagram showing the structure of an autonomous robot;

FIG. 8 is a diagram illustrating the program processing unit of the second embodiment;

FIG. 9 is a block diagram showing the structure of a program processing unit according to the third embodiment of the present invention;

FIG. 11 is a diagram illustrating the program processing unit of the third embodiment;

DESCRIPTION OF THE PREFERRED EMBODIMENTS

Figure 1:
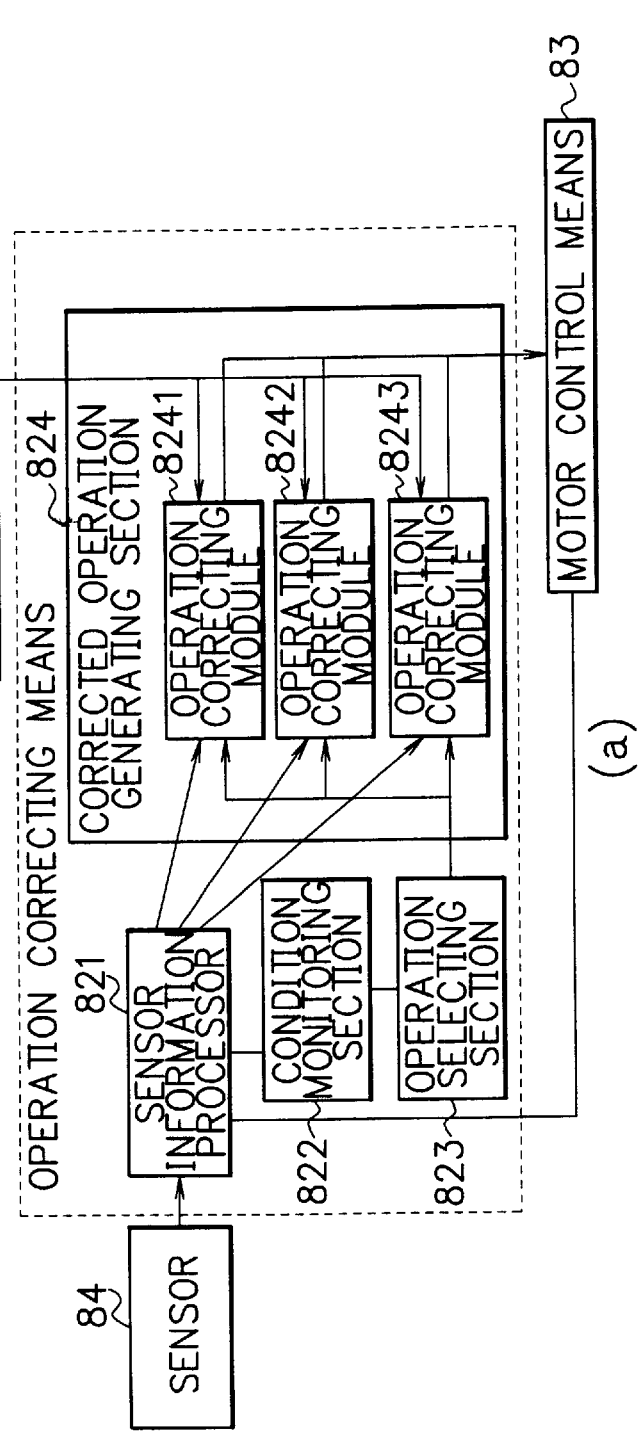
FIG. 1 is a block diagram showing the structure of a conventional robot control unit.

Referring now to the drawings, a description of preferred embodiments of the present invention will be given in detail.

A robot program processing unit according to the present invention comprises a command unit for issuing a command for a robot, a storage for storing information, an input unit for inputting information from the outside to the storage, a processing unit for executing a program, an actuator that operates with a control signal from the processing unit, and preferably, one or more sensor(s) for acquiring external environment. The rule to reject a command is expressed by direct product, direct sum or null (zero/blank: no operation including halt condition) individually, or in pairs. The storage used in the present invention may be a storage which can keep data permanently (semi-permanently) unless the data are rewritten, or one for temporary data such as a cache memory. Data may be saved in the storage optically, magnetically or other known methods.

In accordance with the first embodiment of the present invention, a robot program processing unit comprises a command unit 5 for giving instructions to start execution of a program, a program processing unit 1 for executing the program, a storage 2 for storing and saving information, an input unit 6 for inputting the information, an actuator 4 for actuating a robot for external environment, and further, a sensor 3 for acquiring external environment or changes in the external environment come out with the command execution.

The storage 2 includes a program storage section 21 for storing the program, a command rejection rule storage section 22 for storing rules to reject commands in the program (hereinafter referred to as command rejection rule), and a source information storage section 23 for storing information about the resource of the program.

The program is assumed to be a script written in such script languages as Perl and Tcl, or an intermediate code outputted by the Java compiler, and executed by an interpreter. Consequently, it is possible to judge the validity of a command and its parameters during or before execution of the program.

The source information includes a programmer name and an acquisition method, such as FTP (File Transfer Protocol), E-mail or self-made, for each program downloaded or inputted by other methods.

In the command rejection rule, there is described a pair of rejection conditions for judging whether or not to reject a command and a command to be rejected. As the rejection conditions, conditions concerning command's parameters, and at least either source information or sensor information may be described in combination.

For combining the conditions, for example, AND and OR of conditional statements in C language may be used individually or in combination. In addition, the conditions may include the above-mentioned null (zero/blank: no operation or no condition).

As the command rejection rule, for example, in the case of an program obtained by FTP, it is possible to describe a rule for rejecting execution of a move command designated at speed over 50 centimeters a second when it is detected that someone is near the robot. The command rejection rule is independent of the program and the program processing unit 1, and therefore replaceable depending on user's needs. The command rejection rule may be a text in which a command name, sensor name, a URL indicating where a program came from, arguments and comparative values are expressed by character strings, or binary data a part of which is coded and expressed numerically.

The input unit 6 obtains a program through operation of user, by receiving E-mail or periodically doing FTP, and stores the program in the storage 2. At the same time, information about resource of the program is stored in the storage 2. Besides, prescribed command rejection rules are also stored in the storage 2 by user's operation.

The program processing unit 1 includes a program interpreter 11, a command rejection means 12 and a command execution means 13. The program interpreter 11 reads a program and retrieves a command for actuating the actuator 4. The command rejection means 12 obtains a command rejection rule, and judges whether or not to reject the command based on the command rejection rule, parameters of the command, source information and sensor information. The command execution means 13 executes the command and actuates the actuator 4.

Figure 2:
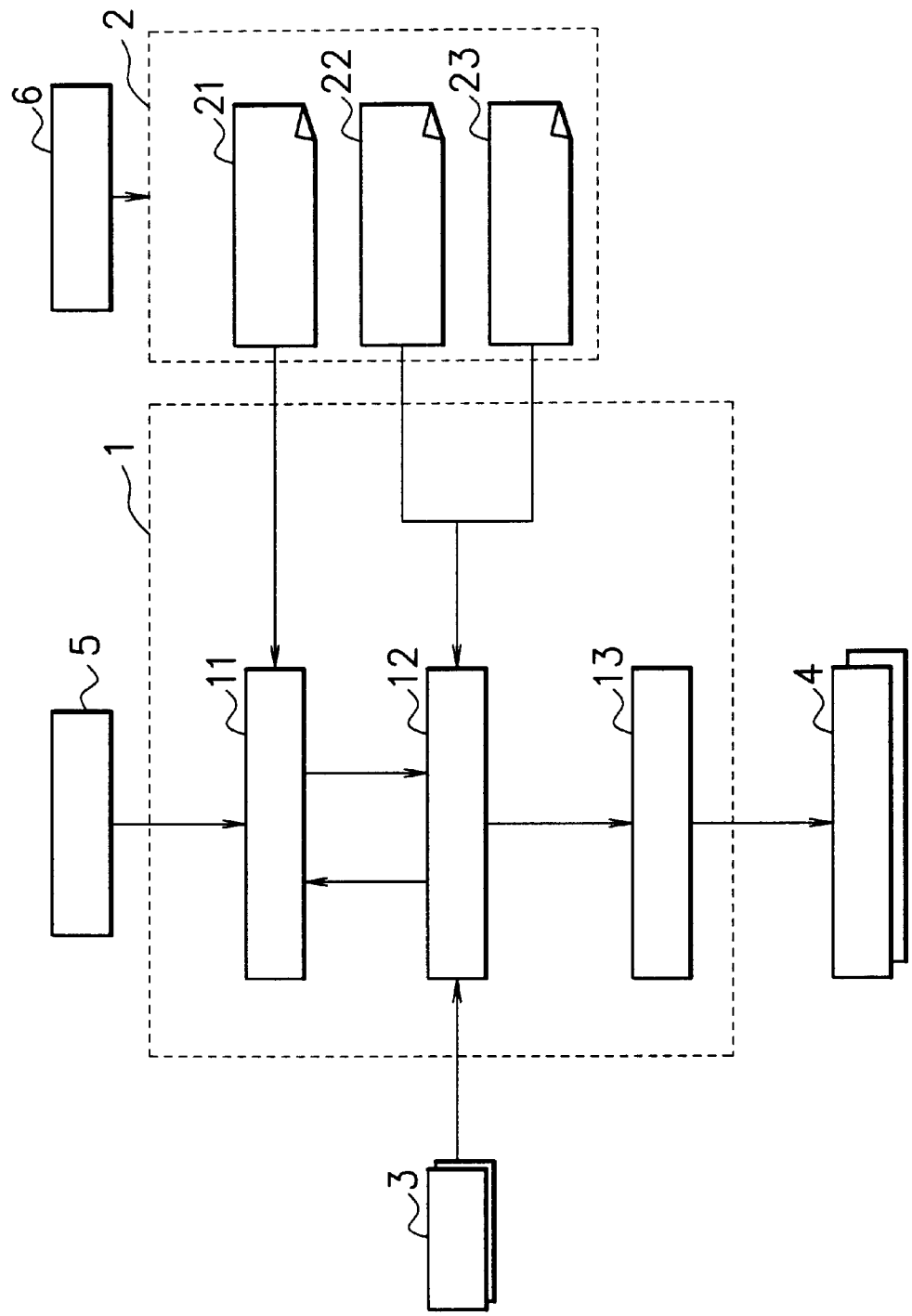
FIG. 2 is a block diagram showing the structure of a program processing unit according to the first embodiment of the present invention.
Figure 3:
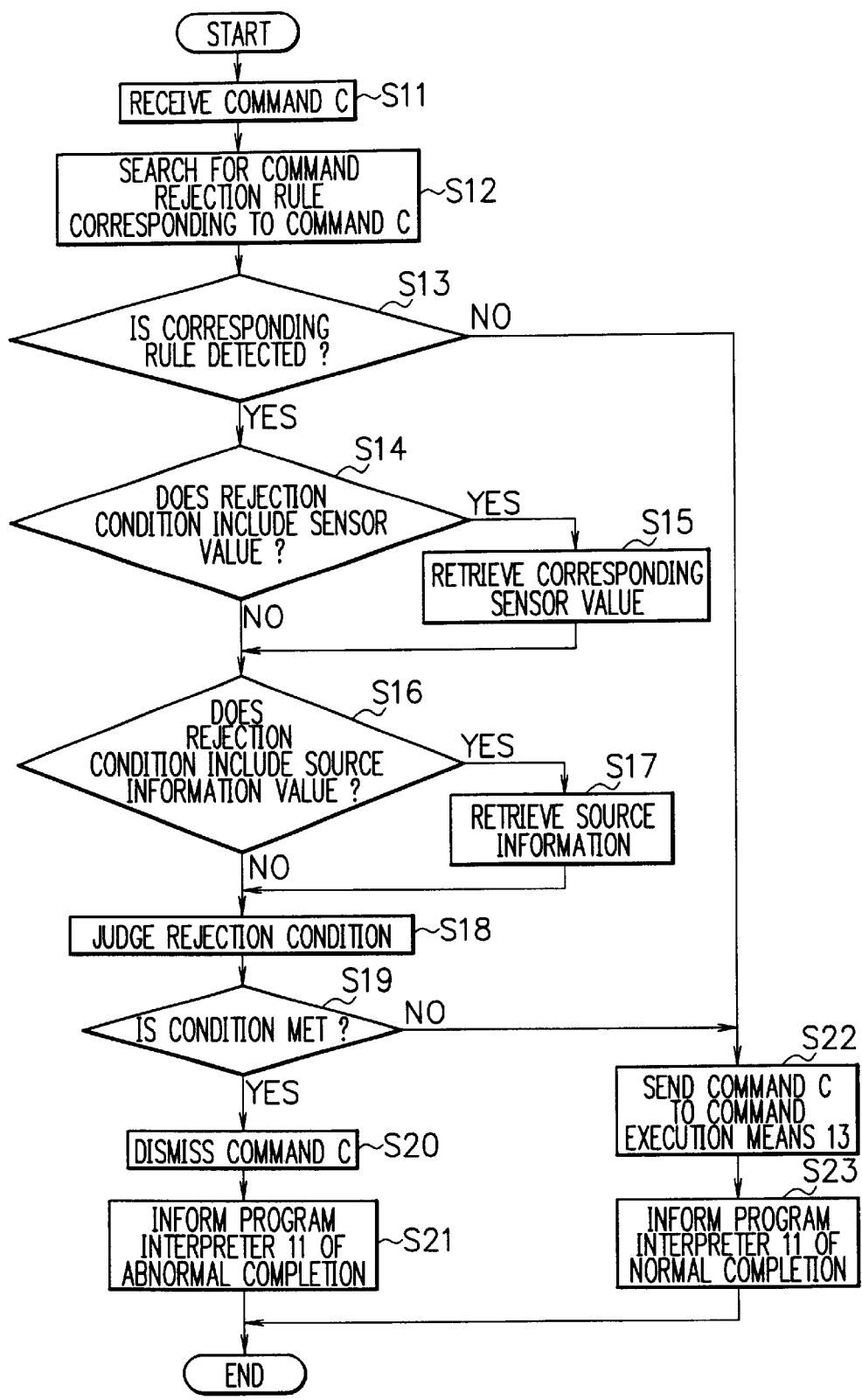
FIG. 3 is a flowchart showing the operation of the program processing unit of the first embodiment.

In the following, the operation of the first embodiment of the present invention will be explained with reference to FIGS. 2 and 3.

When the command unit 5 designates the program name of program P to be executed, the program interpreter 11 reads program P from the program storage section 21.

Next, the program interpreter 11 executes the same processes as those executed by a processing system for a general script language during execution, such as interpretation of a control statement in the program and substitution for a variable. In the case where a command is detected while interpreting the program, the program interpreter 11 sends the command (command C) to the command rejection means 12.

On receipt of command C (step S11), the command rejection means 12 searches for command rejection rule R corresponding to command C in the command rejection rule storage section 22 (step S12). When command rejection rule R is detected (step S13/YES), the command rejection means 12 checks whether or not rejection conditions of command rejection rule R include conditions concerning sensor information (step S14). When the sensor information conditions are included (step S14/YES), the command rejection means 12 retrieves input values from the sensor 3 (step S15). Further, the command rejection means 12 checks whether or not the rejection conditions include conditions concerning source information (step S16). When the source information conditions are included (step S16/YES), the command rejection means 12 retrieves the source information from the source information storage section 23 (step S17). Incidentally, step S14 may be omitted. In this case, the sensor input values are fetched regardless of whether or not command rejection rule R includes the sensor information conditions. It is likewise possible to omit step S16.

Subsequently, the command rejection means 12 judges whether or not the rejection conditions are met by using at least one selected from the input values from the sensor, the source information, the command and its parameters (step S18). When the rejection conditions are met (step S19/YES), the command rejection means 12 dismisses the command (step S20), and informs the program interpreter 11 of abnormal completion (step S21) without executing any operation.

On the other hand, when the rejection conditions are not met (step S19/NO), the command rejection means 12 sends command C to the command execution means 13 (step S22), and informs the program interpreter 11 of normal completion (step S23). Additionally, when there is no command rejection rule corresponding to command C (step S13/NO), the command rejection means 12 also sends command C to the command execution means 13 (step S22), and informs the program interpreter 11 of normal completion (step S23).

Having received command C, the command execution means 13 executes command C and actuates the actuator 4. The program interpreter 11 immediately terminates execution of the program when notified of the abnormal completion by the command rejection means 12. The program interpreter 11 continues interpretation of the program when notified of the normal completion.

In the following, the effect in the first embodiment of the present invention will be explained. According to the first embodiment of the present invention, commands that can be issued by a program are qualified based on input values from the sensor, source information, commands and parameters of commands. Therefore, it is possible to prevent a robot and those around the robot from being damaged due to execution of an unknown program. Moreover, command execution is unrestricted unless rejection conditions in a command rejection rule are satisfied. Consequently, the safety of a robot can be improved without reducing functional extensibility of the robot.

Next, the robot program processing unit of the first embodiment will be explained concretely with reference to FIGS. 2 to 5.

In this embodiment, the robot program processing unit is applied to an autonomous robot that has a conversation with people while moving around the room and controls electrical appliances by remote control.

FIG. 5 is a block diagram showing the structure of the autonomous robot. The autonomous robot 7 is provided with an ultrasonic range sensor 71 for measuring the distance to surroundings, a CCD camera 72 for image recognition, a microphone 73 for voice recognition, and a multidirectional microphone 74 for detecting the direction of sound source as sensors. Besides, the autonomous robot 7 has a foot motor 75 for movement, a head motor 76 for turning the head, a remote controller 77 for controlling electrical appliances such as a television, and a speaker 79 with a voice synthesis function for speech as actuators. Furthermore, the autonomous robot 7 is provided with a computer 78. The computer 78 includes a processor 781, a memory 782 and an HDD 783 as the program processing unit 1 and storage 2 in the same manner as commonly used computers. In addition, the microphone 73 for voice recognition is used as the command unit 5 in the robot 7. That is, execution of a program is requested by detecting user's speech through the microphone 73. The program execution by voice recognition is a technique already in practical use for the Smart Voice manufactured by NEC, and a detailed description thereof will be omitted. The autonomous robot 7 also has a wireless LAN adaptor 710 as the input unit 6 in this embodiment. The HDD 783 is accessible via the wireless LAN from a computer other than the robot 7 or a terminal having a communication facility (including a cellular phone, PDA, etc). The program may be obtained through the wireless LAN from the outside by using a E-mail program or FTP program executed by the processor 781.

In the first embodiment, an interpreter implemented in the processor 781 is read from the HDD 783 into the memory 782 to be executed when the robot is activated. The interpreter may be hardware logic in a ROM or the processor. The storage 2 may be a file stored in the HDD 783, and read into the memory 782 to be referred according to need.

As input values from the ultrasonic range sensor 71, the direction and distance to objects are obtained with regard to right hand, left hand, forward and backward in the form of, for example, "right 30 cm, left 200 cm, forward 400 cm, backward 400 cm". An input value from the multidirectional microphone 74 may indicate one of directions right hand, left hand, forward and backward. Basically, between directions forward and backward, a positive value is defined to indicate "forward", and thus other directions can be defined. An input value from the CCD camera may indicate human or non-human. As for an input value from the microphone 73, a word string may be obtained as a result of the voice recognition. A command input value (parameter) may be used in addition to/instead of the input value from the microphone.

Incidentally, a laser (including IR light) may be used as a sensor for identifying the position. Besides, GPS (Global Positioning System) including D-GPS may also be applied.

There are two kinds of commands, "move" and "rotate", for the foot motor 75. "Move" is a command to move the robot forward or backward. In command "move", distance and speed are specified as parameters. Positive speed indicates forward movement, and negative speed indicates backward movement. "Rotate" is a command to rotate the robot on the spot. In command "rotate", angle and angular speed are specified as parameters. Negative angular speed indicates right-hand rotation, and positive angular speed indicates left-hand rotation. "TurnHead" is a command for the head motor 76 to turn up and down robot's head. For command "TurnHead", angle and angular speed are specified as parameters. Positive angular speed indicates turning up, and negative angular speed indicates turning down. "TVpower" is a command for the remote controller 77 to turn on/off a television. The command does not includes parameters, and toggles back and forth between ON and OFF. "Speech" is a command for the speaker 79 to vocalize a word string given as a parameter by using voice synthesis. Additionally, the axis of rotation may be decided by x axis, y axis, z axis or others arbitrarily and freely.

In this embodiment, the command rejection rules are implemented as a text file. The content of the file may be a list having a command to be rejected and conditions to judge whether or not to reject the command as an entry, or a matrix. In the list, the command and rejection conditions are expressed by character strings, and a comma is put between them. Each entry is deliminated by a newline character. The rejection conditions are written in the same style as the conditional statement in C language. Namely, logical product "&&", equal sign "==", inequality sign (not equal) "!", ">" indicating the left side member is more than the right, and ">=" indicating the left side member is equal to or more than the right can be used as operators, and besides, it is possible to set an ordering of priority by using brackets "()".

While the conditional statement is written in C language in this embodiment, it is possible to use other known programming languages such as Basic and Perl.

FIG. 4 shows an example of the command rejection rule. Command rejection rule R11 in command rejection rule file R1 rejects execution of "move" command when the programmer is not "NEC", a forward ultrasonic sensor value is less than 50 cm, and the parameter 2 indicating speed is positive (forward movement). Similarly, command rejection rule R12 rejects execution of "move" command when the programmer is not "NEC", a backward ultrasonic sensor value is less than 50 cm, and the parameter 2 is negative (backward movement).

The source information is also implemented as a text file. The content of the file may be a list having a program name, retrieving method and programmer name as an entry, or a matrix. In the list, a comma is put between items. Each entry is deliminated by a newline character. In an example of the source information file of FIG. 4, source information J11 in source information file J1 indicates that a program named "find a person" is programmed by "TOM" and retrieved by "FTP".

In the following, the operation of the first embodiment will be explained with concrete examples. Program P1 is assumed to be stored on the HDD 783 in the name of "find a person" as a file. On receipt of a request for execution of a program named "find a person" through the microphone 73 for voice recognition, the program interpreter 11 reads program P1 having the name "find a person", and starts interpreting the program.

When the program interpreter 11 detects command C2 "move (30 cm, 10 cm/s)" while interpreting program P1, command C2 is sent to the command rejection means 12. The command rejection means 12 searches command rejection rule file R1, and obtains command rejection rules R11 and R12 corresponding to "move" command. Having interpreted command rejection rule R11, the command rejection means 12 detects that rejection conditions include conditions concerning a programmer, input values from the ultrasonic range sensor and the second parameter. The command rejection means 12 first obtains the input values from the ultrasonic range sensor. Referring to input U1 from the ultrasonic range sensor, the forward ultrasonic sensor value is 20 cm, and thus the rejection condition "ultrasonic range sensor value (forward)<50 cm" is satisfied. The command rejection means 12 then obtains source information corresponding to the program "find a person", and detects that the programmer of the program is "TOM". In addition, the value of the second parameter 2 is "10 cm/s" in command C2. With the information, the command rejection means 12 judges the rejection conditions of command rejection rule R11 "programmer!=NEC && ultrasonic range sensor (forward)<50 cm && parameter 2>0 cm/s", and determines that all the conditions are satisfied. As a result, command C2 is dismissed.

On the other hand, in the case of command C3 "move (30 cm, −10 cm/s)", the rejection conditions of command rejection rules R11 and R12 corresponding to "move" command are not satisfied. Consequently, command C3 is executed by the command execution means 13.

For command C1 "rotate (30-degree, 10-degree/s)" and command C4 "TVpower", the condition judgment is not conducted since there is no corresponding command rejection rule. Thus commands C1 and C4 are executed.

This embodiment may be modified so that, when rejection conditions of a command rejection rule are satisfied, and the command rejection means 12 informs abnormal completion, the program interpreter 11 does not terminate operations but continues interpretation of the program. Accordingly, the program can be safely executed to the end without interruption.

In the following, a description will be given of a robot program processing unit according to the second embodiment of the present invention. In the second embodiment, command execution history is used as a command rejection condition instead of input values from the sensor differently from the first embodiment.

First, the structure of the robot program processing unit according to the second embodiment of the present invention will be explained with reference to FIG. 6.

The robot program processing unit of the second embodiment comprises a second program processing unit 102 and a second storage 202 as substitutes for the program processing unit 1 and the storage 2 in the first embodiment, respectively.

The second storage 202 includes a program storage section 21, a second command rejection rule storage section 222, a source information storage section 23, and an execution history storage section 24. The program storage section 21 is the same as that of the storage 2 in the first embodiment. The execution history storage section 24 stores the execution history of commands with execution time and parameters. The second command rejection rule storage section 222 stores command rejection rules similarly to the command rejection rule storage section 22 in the first embodiment, however, the command rejection rule includes conditions for evaluating the execution history as rejection conditions.

The second program processing unit 102 includes a second command rejection means 122 and a second command execution means 132 as substitutes for the command rejection means 12 and the command execution means 13 of the program processing unit 1, respectively. The second command rejection means 122 obtains source information and command execution history, and judges rejection conditions of a command rejection rule using the information. The second command execution means 132 executes a command, and stores the command, execution time and parameters in the execution history storage section 24.

Figure 6:
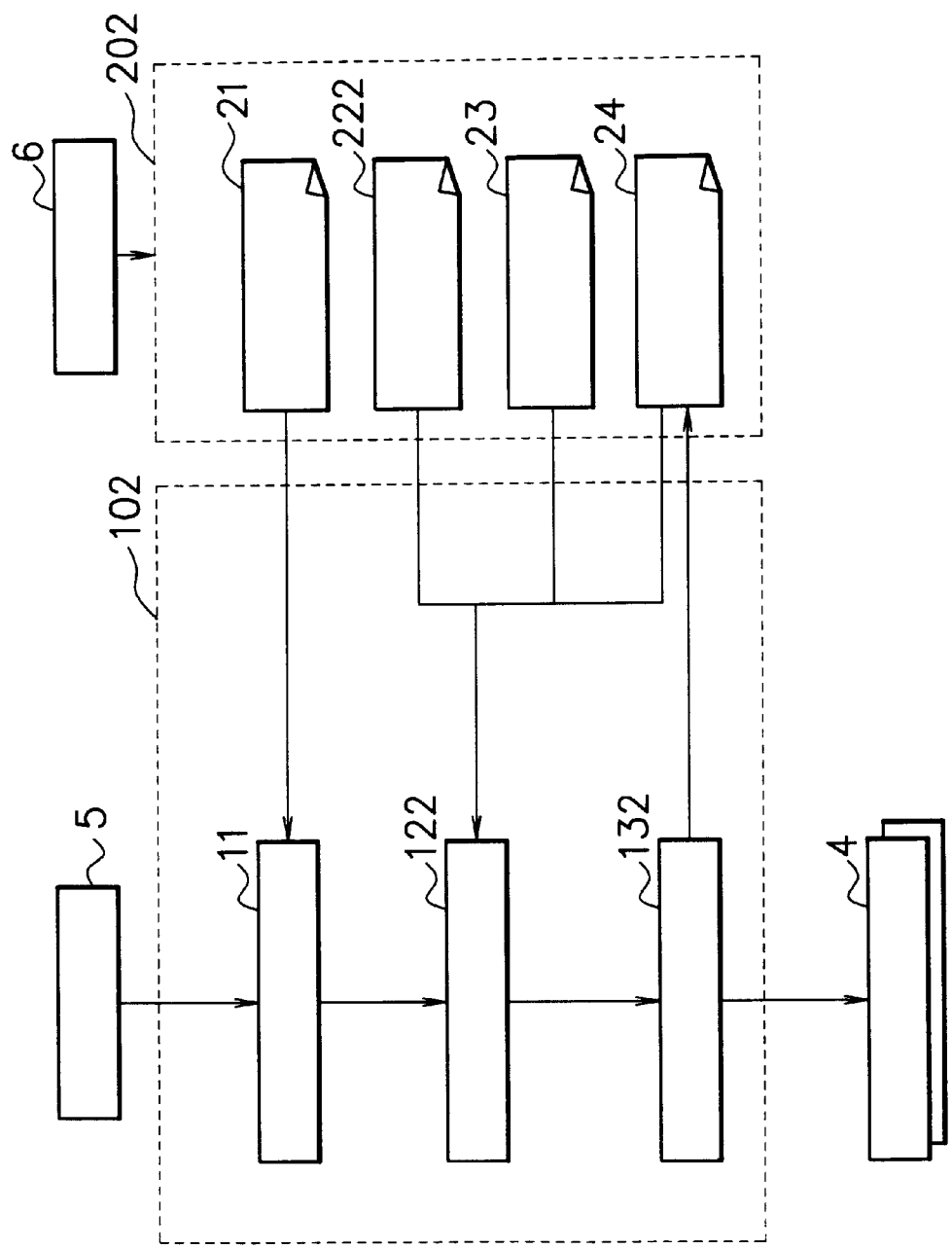
FIG. 6 is a block diagram showing the structure of a program processing unit according to the second embodiment of the present invention.
Figure 7:
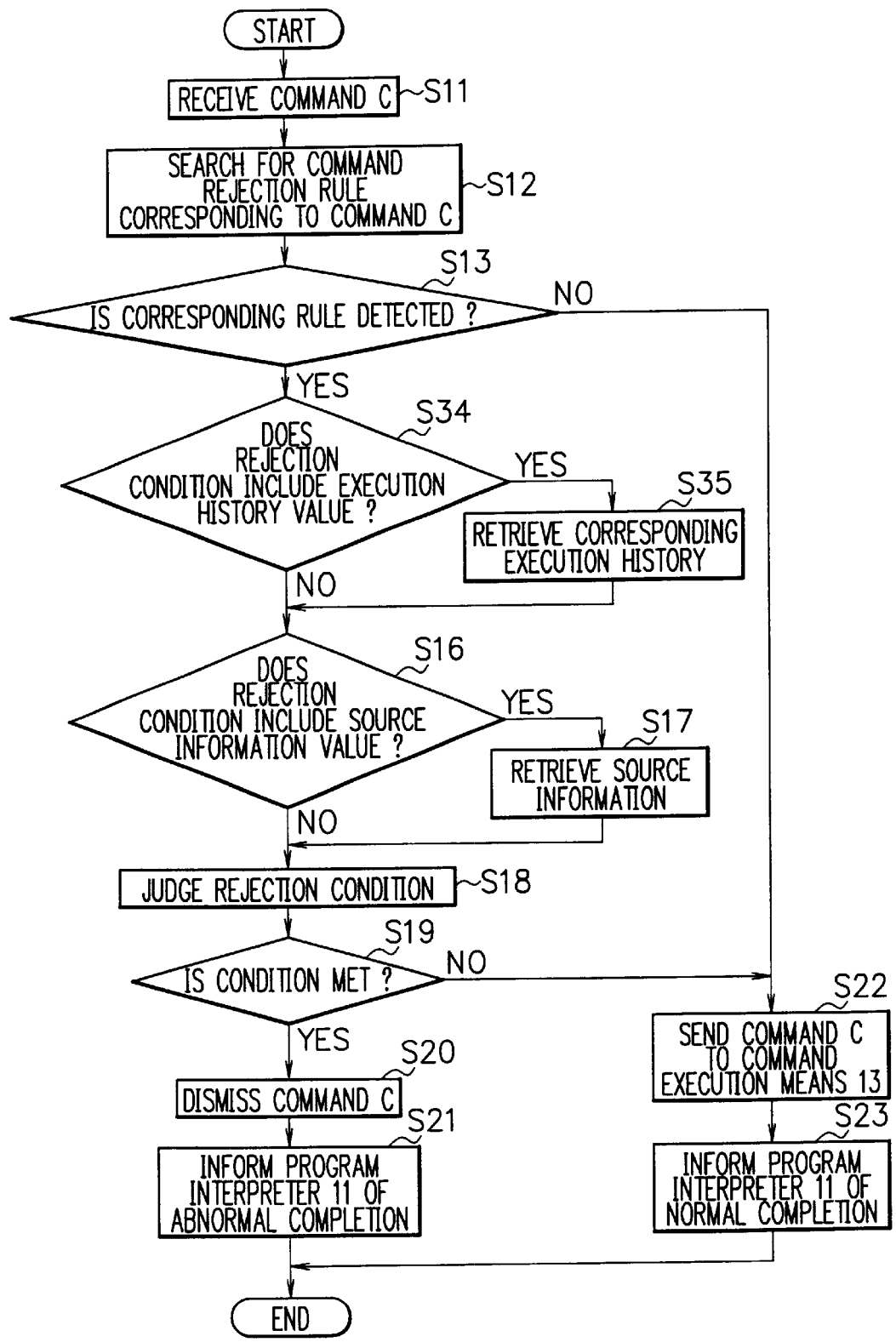
FIG. 7 is a flowchart showing the operation of the program processing unit of the second embodiment.

Referring to FIGS. 6 and 7, the operation of the robot program processing unit according to the second embodiment of the present invention will be explained.

The program interpreter 11 interprets a program in the same manner as the first embodiment, and sends command C to the second command rejection means 122.

As for the operation of the second command rejection means 122, a detailed description will be given with reference to FIG. 7. The difference between the command rejection means 12 of the first embodiment and the second command rejection means 122 is that command execution history is used instead of sensor values. Namely, the second command rejection means 122 checks whether or not conditions concerning execution history are included in rejection conditions (step S34), and if included (step S34/YES), retrieves corresponding execution history from the execution history storage section 24 (step S35). In addition, the second command rejection means 122 retrieves source information (step S16/YES, step S17), and judges the rejection conditions by using the information, a command and its parameters (step S18). Incidentally, step S34 may be omitted. In this case, the execution history is fetched regardless of whether or not the rejection conditions include the execution history conditions. It is likewise possible to omit step S16.

Having received command C, the second command execution means 132 executes command C and actuates the actuator 4. Besides, the second command execution means 132 stores a record of the command execution in the execution history storage section 24. The program interpreter 11 immediately terminates execution of the program when informed of abnormal completion by the second command rejection means 122, and continues interpretation of the program when informed of normal completion in the same manner as the first embodiment.

In the following, the effect of the second embodiment of the present invention will be explained. According to the second embodiment of the present invention, commands that can be issued by a program are qualified by source information of the program, command execution history, the command and its parameters. Therefore, it is possible to prevent a robot and other equipment from being damaged due to a command that is frequently repeated.

Next, the robot program processing unit of the second embodiment will be explained concretely with reference to FIGS. 5 to 8.

In this embodiment, the robot program processing unit is applied to the autonomous robot of FIG. 5 similarly to the first embodiment. The difference between the first and second embodiments being only the structure of the storage and the operation of the program processing unit a description will be given in this regard.

The second storage 202 is implemented as an area on the HDD 783. Besides, the second command rejection rules and execution history are implemented as a file on the HDD 783 as well as a program and source information.

In the second embodiment, rejection conditions of a command rejection rule include conditions concerning parameters, source information and command execution history. FIG. 8 shows an example of the command rejection rule. Command rejection rule R21 in command rejection rule file R2 rejects execution of "rotate" command when the programmer is not "NEC" and "rotate" command has been executed ten or more times in the past ten seconds. Command rejection rule R22 rejects execution of "TVpower" command when "TVpower" command has been called three or more times in the past ten seconds.

The execution history storage section 24 is implemented as a text file. The content of the file may be expressed as a list having date and hour, and a command (including parameters) as an entry, or a matrix. In the list, date and hour, and a command are described by character strings, and a comma is put between items. Each entry is deliminated by a newline character. A new entry is added to the head of the list. FIG. 8 shows an example of execution history. In execution history file H1, entry H11 indicates that "TVpower" command was executed on Jan. 1, 2000 at 14:01:10 without parameters. Similarly, entries H12 to H16 but H14 indicate that "TVpower" command was executed on each time of day. Besides, entry H14 indicates that "move" command with a parameter (30 cm, 10 cm/s) was executed on Jan. 1, 2000 at 14:01:02. The content of source information file J1 is the same as that of FIG. 4 in the first embodiment.

In the following, the operation of the second embodiment will be explained with concrete examples. In the explanation, program P1 named "find a person" is executed as is the case with the first embodiment.

The operation of the program interpreter 11 is the same as that of the program processing unit 1 in the first embodiment.

On receipt of command C4 "TVpower", the second command rejection means 122 searches the command rejection rule file R2, and obtains command rejection rule 22 corresponding to "TVpower" command. Having interpreted rejection conditions "programmer!=NEC && count (TVpower, 10 seconds)>=3" of command rejection rule R22, the second command rejection means 122 detects that the rejection conditions include conditions concerning the programmer of the program and command execution history. Assuming that the second command rejection means 122 receives command C4 on Jan. 1, 2000 at 14:01:12, there are four commands H 11 to H 14 which have been executed since 10 seconds before, 14:01:02, on the same date according to execution history file H1, and "TVpower" command appears three times therein. With the conditions and also entry J11 in source information file J1, "move" command C4 is dismissed.

On the other hand, in the case of command C1 "rotate (30-degree, 10-degree/s)", rejection conditions "programmer!=NEC && count (rotate, 10 seconds)>=10" of command rejection rule R21 is judged. Assuming that the second command rejection means 122 receives command C1 on Jan. 1, 2000 at 14:01:12, no "rotate" command has been executed since 10 seconds before, 14:01:02, until 14:01:12 according to execution history file H1, and thus the condition of command rejection rule R21 is not satisfied. As a result, command C1 is executed.

In the following, a description will be given of a robot program processing unit according to the third embodiment of the present invention. In the third embodiment, parameters of a command are changed so as to be safe instead of rejecting the command, or a completely different command is executed to continue the operation differently from the first embodiment.

Referring to FIG. 9, the structure of the robot program processing unit according to the third embodiment of the present invention will be explained.

The robot program processing unit of the third embodiment comprises a third program processing unit 103 and a third storage 203 as substitutes for the program processing unit 1 and the storage 2 in the first embodiment, respectively.

The third storage 203 includes a command change rule storage section 25 as a substitute for the command rejection rule storage section 22 of the storage 2. The command change rule storage section 25 stores commands to be changed, conditions for judging whether or not to change commands and alternative commands to be executed when the conditions are met. The alternative command includes parameters, and it is possible to change only parameters. Incidentally, in the case of using a parameter of an original command as a parameter for alternative one, "parameter 1", for example, is written in the parameter part of the alternative command. The parameter may include the above-mentioned null.

The third program processing unit 103 includes a command change means 14 as a substitute for the command rejection means 12 of the program processing unit 1. The command change means 14 judges conditions of a command change rule, and replaces a command by an alternative command in the command change rule when the conditions are satisfied.

Figure 10:
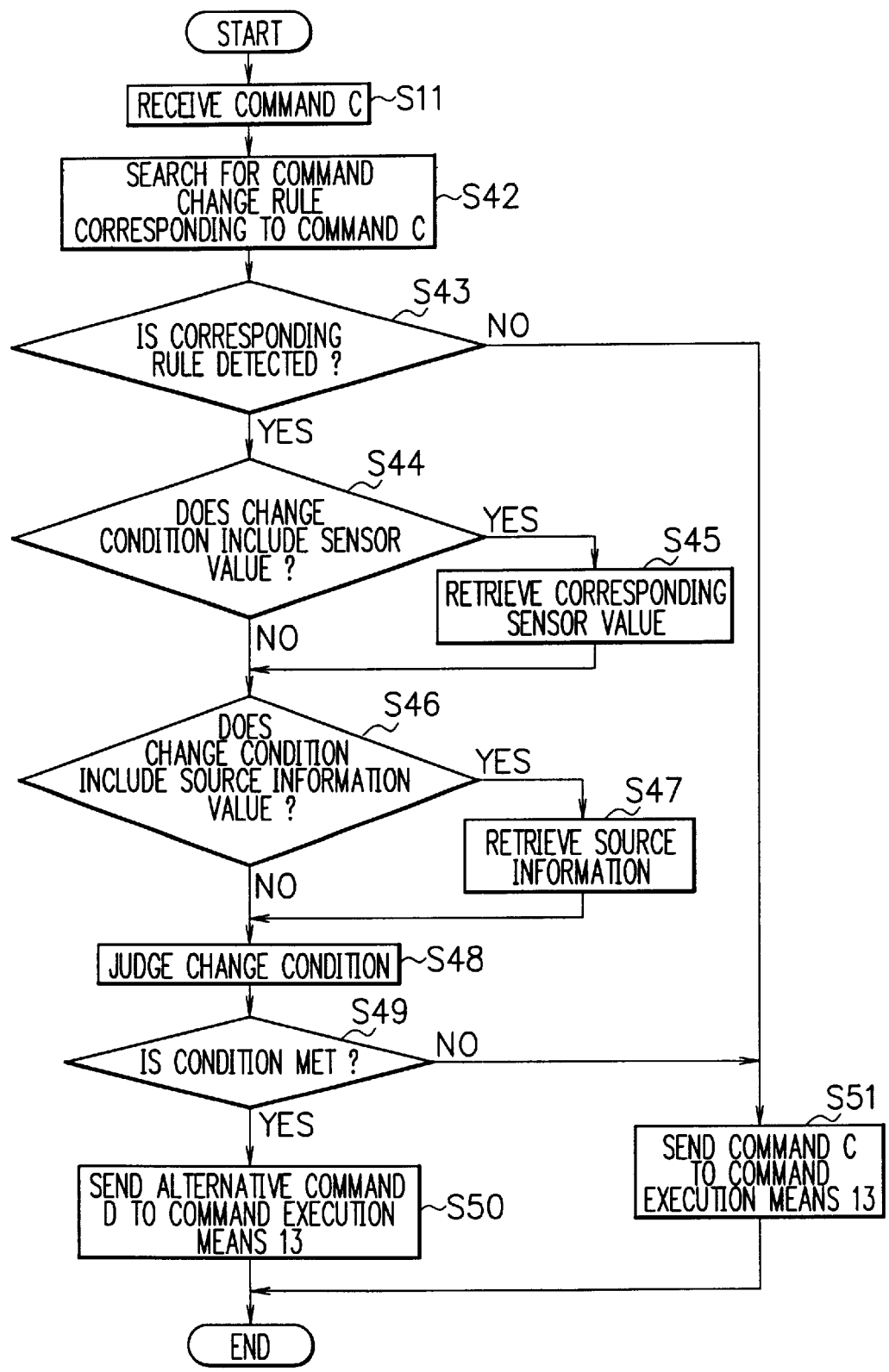
FIG. 10 is a flowchart showing the operation of the program processing unit of the third embodiment.

Referring to FIGS. 9 and 10, the operation of the robot program processing unit according to the third embodiment of the present invention will be explained.

The program interpreter 11 interprets a program in the same manner as the first embodiment, and sends command C to the command change means 14.

The operation of the command change means 14 will be explained in detail with reference to FIG. 10. On receipt of command C (step S11), the command change means 14 searches the command change rule storage section 25 for command change rule R corresponding to command C (step S42). When corresponding command change rule R is detected (step S43/YES), the command change means 14 checks whether or not command change rule R includes conditions concerning sensor information as change conditions (step S44). When the conditions concerning sensor information are included (step S44/YES), the command change means 14 retrieves input values from the sensor 3 (step S45). Besides, the command change means 14 checks whether or not the change conditions includes conditions concerning source information (step S46). When the conditions concerning source information are included (step S46/YES), the command change means 14 retrieves the source information from the source information storage section 23 (step S47). Incidentally, step S44 may be omitted. In this case, the sensor input values are fetched regardless of whether or not command change rule R includes the sensor information conditions. It is likewise possible to omit step S46.

Subsequently, the command change means 14 judges whether or not the change conditions are met by using at least one selected from the input values from the sensor, the source information, the command and its parameters (step S48). When the change conditions are met (step S49/YES), the command change means 14 sends alternative command D to the command execution means 13 as a substitute for command C (step S50). On the other hand, when the change conditions are not met (step S49/NO), the command change means 14 sends command C to the command execution means 13 (step S51). Besides, when there is no command change rule corresponding to command C (step S43/NO), the command change means 14 also sends command C to the command execution means 13 (step S51).

Having received command C or alternative command D, the command execution means 13 executes the command and actuates the actuator 4.

In the following, the effect of the third embodiment of the present invention will be explained. According to the third embodiment, for even a program that includes a harmful command, execution can be continued safely without interruption by using an alternative command. Therefore, the safety of a robot can be improved without reducing its functional extensibility.

Next, the robot program processing unit of the third embodiment will be explained concretely with reference to FIGS. 5, 9, 10 and 11.

In this embodiment, the robot program processing unit is applied to the autonomous robot of FIG. 5 in the same manner as the first embodiment. The difference between the first and third embodiments being only the storage and the program processing unit a description will be given in this regard.

The third storage 203 is implemented as an area on the HDD 783. Besides, the command change rules are implemented as a file on the HDD 783 as well as a program or source information. Incidentally, a storage for temporary data such as RAM and a cache memory may be used instead of an HDD. This applies also to other embodiments.

The command change rules are implemented as a text file. The content of the file may be a list having as an entry a command, change conditions and an alternative command, or a matrix. The form of the list is similar to command rejection rule file R1 except for including alternative commands in addition to commands and conditions. A comma is put between those items. FIG. 11 shows an example of the command change rules. Command change rule R31 in command change rule file R3 indicates that speed, the second parameter of "move" command, is reduced to 5 cm/s when change conditions are met. As for distance, which is the first parameter of "move" command, the first parameter of the original command is used. In addition, command change rule R32 indicates that "robot rotates" is vocalized instead of executing "rotate" command when change conditions are met.

In the following, the operation of the third embodiment will be explained with concrete examples. First, the program interpreter 11 starts interpreting program P1 named "find a person" as is the case with the first embodiment.

When the program interpreter 11 detects command C2 "move (30 cm, 10 cm/s)" and sends command C2 to the command change means 14, the command change means 14 searches command change rule file R3 from the top, and obtains command change rule R31 corresponding to "move" command. Since command change rule R31 includes conditions concerning the programmer of the program and the ultrasonic range sensor, the command change means 14 obtains input U1 from the ultrasonic range sensor and corresponding information in source information file J1. The change conditions of command change rule R31 are judged based on the information, and found to be satisfied. As a result, the command change means 14 obtains alternative command "move (parameter 1, 5 cm/s)". The first parameter of the original command is used as the first parameter, and thereby command "move (30 cm, 5 cm/s)" is sent to the command execution means 13 in the last result. Besides, when the command change means 14 receives command C1, command change rule R32 is adopted, and "speech" command is executed instead of "rotate" command.

While the first embodiment is modified in the description of the third embodiment, the second embodiment can likewise be modified by substituting the second command rejection means 122 with a command change means. The modification can be made on software as well as on hardware. In this case, the same effect as in the third embodiment can be achieved.

A robot program processing unit according to the present invention is not limited to a certain application, and applicable to a wide variety of robots such as an industrial robot and personal robot. Extended programs retrieved from the outside by downloads etc. are mainly used for the processing unit, however, other kind of programs, for example, a previously programmed non-extended program, may also be used with the same effect.

In the following, a description will be given of a robot program processing unit according to the fourth embodiment of the present invention. The robot program processing unit of the fourth embodiment is of like construction as that of the first embodiment, namely, the unit comprises a command unit 5 for giving instructions to start execution of a program, a program processing unit 1 for executing the program, a storage 2 for storing and saving information, an input unit 6 for inputting the information, an actuator 4 for actuating a robot externally, and one or more sensor(s) for acquiring external environment. The sensor is not limited to the specific number or specific kind, and it is possible to use one or more kind(s) of one or more sensor(s). Examples of the sensor include, but are not limited to, an ultrasonic range sensor, a CCD camera, a microphone, and a multidirectional microphone as shown in FIG. 5. Other devices capable of measuring electrical or optical changes may also be used as the sensor. This applies to other embodiments in which the sensor is adopted.

The storage 2 includes a program storage section 21 for storing the program, a command rejection/change rule storage section for storing command rejection/change rules, and a source information storage section 23 for storing information about the resource of the program. The command rejection rule storage section 22 may store command change rules as the command rejection/change rule storage section. As for the command change rules and alternative command, a description has been given in the above embodiment. Besides, parameters of an original command may be used for the alternative command in the same manner as the above embodiment.

The program may be a script written in such script languages as Perl and Tcl, and executed by an interpreter as described above. Consequently, it is possible to judge the validity of a command and its parameters during or before execution of the program. Preferably, an interpreter executes the program that is written in the above script language. However, it is possible to select other languages arbitrarily so that the program can be executed by a compiler etc. provided that the same effect is achieved. This also applies to other embodiments.

The source information includes a programmer name and an acquisition method, such as FTP (File Transfer Protocol), E-mail or self-made, for each program as described above.

Figure 12:
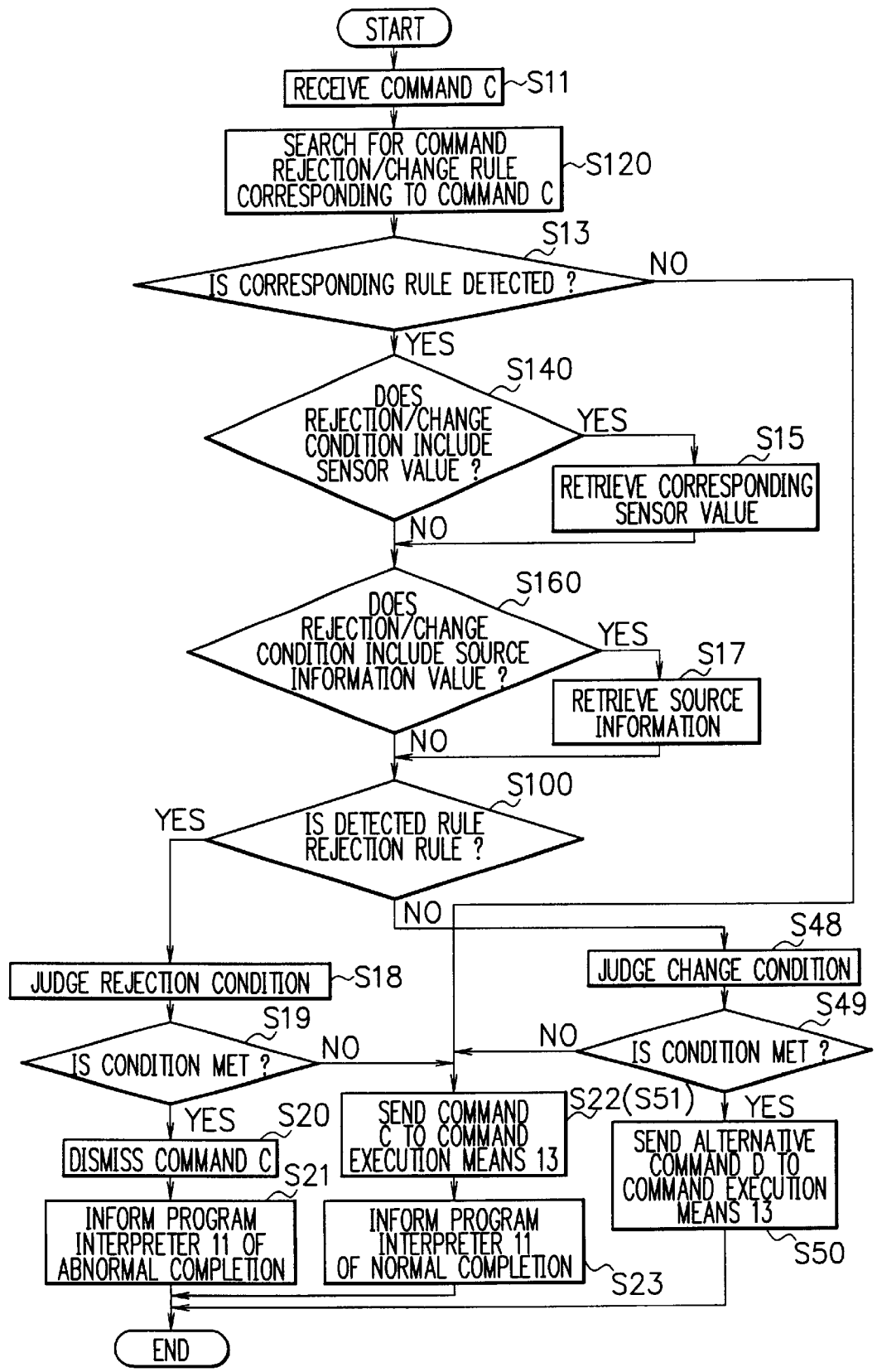
FIG. 12 is a flowchart showing the operation of the program processing unit according to the fourth embodiment of the present invention.

FIG. 12 is a flowchart showing the operation of the robot program processing unit according to the fourth embodiment of the present invention. Like numerals refer to like steps as in other embodiments.

As shown in FIG. 12, both command rejection rules and command change rules are adopted in this embodiment, and therefore there is provided a step for determining whether or not a detected rule is the command rejection rule after step S160. Otherwise, the procedure is similar to that described with respect to the above embodiments.

On receipt of command C (step S11), the command rejection/change means searches for command rejection/change rule R corresponding to command C in the command rejection/change rule storage section (step S120). When command rejection/change rule R is detected (step S13/YES), the command rejection/change means checks whether or not rejection/change conditions of command rejection/change rule R include conditions concerning sensor information (step S140). When the sensor information conditions are included (step S140/YES), the command rejection/change means retrieves sensor values (step S15). Further, the command rejection/change means checks whether or not the rejection/change conditions include conditions concerning source information (step S160). When the source information conditions are included (step S160/YES), the command rejection/change means retrieves the source information from the source information storage section 23 (step S17). Incidentally, step S140 may be omitted. In this case, the sensor values are fetched regardless of whether or not command rejection/change rule R includes the sensor information conditions. It is likewise possible to omit step S160.

When rule R is a command rejection rule (step S100/YES), the command rejection means judges whether or not the rejection conditions are met by using at least one selected from the input values from the sensor, the source information, the command and its parameters (step S18). When the rejection conditions are met (step S19/YES), the command rejection means dismisses the command (step S20), and informs the program interpreter 11 of abnormal completion (step S21).

On the other hand, when the rejection conditions are not met (step S19/NO), the command rejection means sends command C to the command execution means 13 (step S22), and informs the program interpreter 11 of normal completion (step S23). Additionally, when there is no command rejection/change rule corresponding to command C (step S13/NO), the command rejection/change means also sends command C to the command execution means 13 (step S22), and informs the program interpreter 11 of normal completion (step S23).

Having received command C, the command execution means 13 executes command C and actuates the actuator 4. The program interpreter 11 immediately terminates execution of the program when notified of the abnormal completion by the command rejection means. The program interpreter 11 continues interpretation of the program when notified of the normal completion.

When rule R is a command change rule (step S100/NO), the operations of steps S48 to S50 in the third embodiment are executed. That is, the command change means judges whether or not the change conditions are met by using at least one selected from the input values from the sensor, the source information, the command and its parameters (step S48). When the change conditions are met (step S49/YES), the command change means sends alternative command D to the command execution means 13 as a substitute for command C (step S50). On the other hand, when the change conditions are not met (step S49/NO), the command change means sends command C to the command execution means 13 (step S51).

Having received command C or alternative command D, the command execution means 13 executes the command and actuates the actuator 4. Incidentally, in FIG. 12, step S51 corresponds to steps S22 and S23 in the command rejection procedure, and step S23 may be skipped.

In the following, a description will be given of a robot program processing unit according to the fifth embodiment of the present invention.

Figure 13:
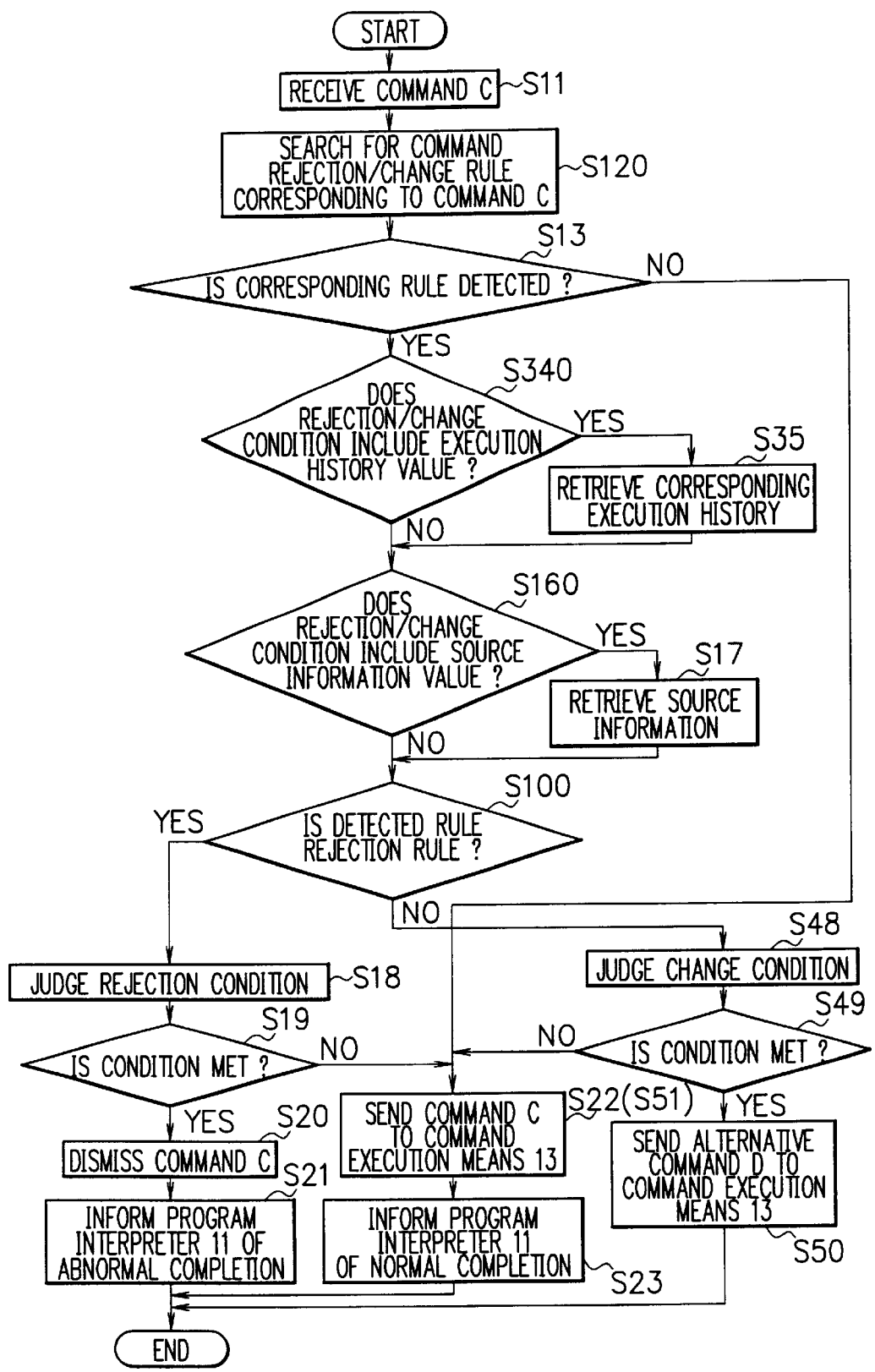
FIG. 13 is a flowchart showing the operation of the program processing unit according to the fifth embodiment of the present invention.

As shown in FIG. 13, the sensor is omissible in this embodiment as is the case with the second embodiment. The procedure is similar to that of the fourth embodiment except that command execution history is used as substitute for input data from the sensor (input value: sensor value) as a result of omitting the sensor.

In the procedure of the fourth embodiment and the fifth embodiment, the operation of step S100 may be performed immediately after step S13. In this case, when rule R is a command rejection rule (step S100/YES), the operations of steps S14 to S23 are conducted afterwards. On the other hand, when rule R is a command change rule (step S100/NO), the operations of steps S44 to S51 are conducted instead.

In addition, while two rules R31 and R32 are described in the command change rule file of FIG. 11, it is obvious that the number of rules is not limited. The same is true of the examples of command rejection rule file in FIGS. 4 and 8.

In the following, a description will be given of a robot program processing unit according to the sixth embodiment of the present invention.

Figure 14:
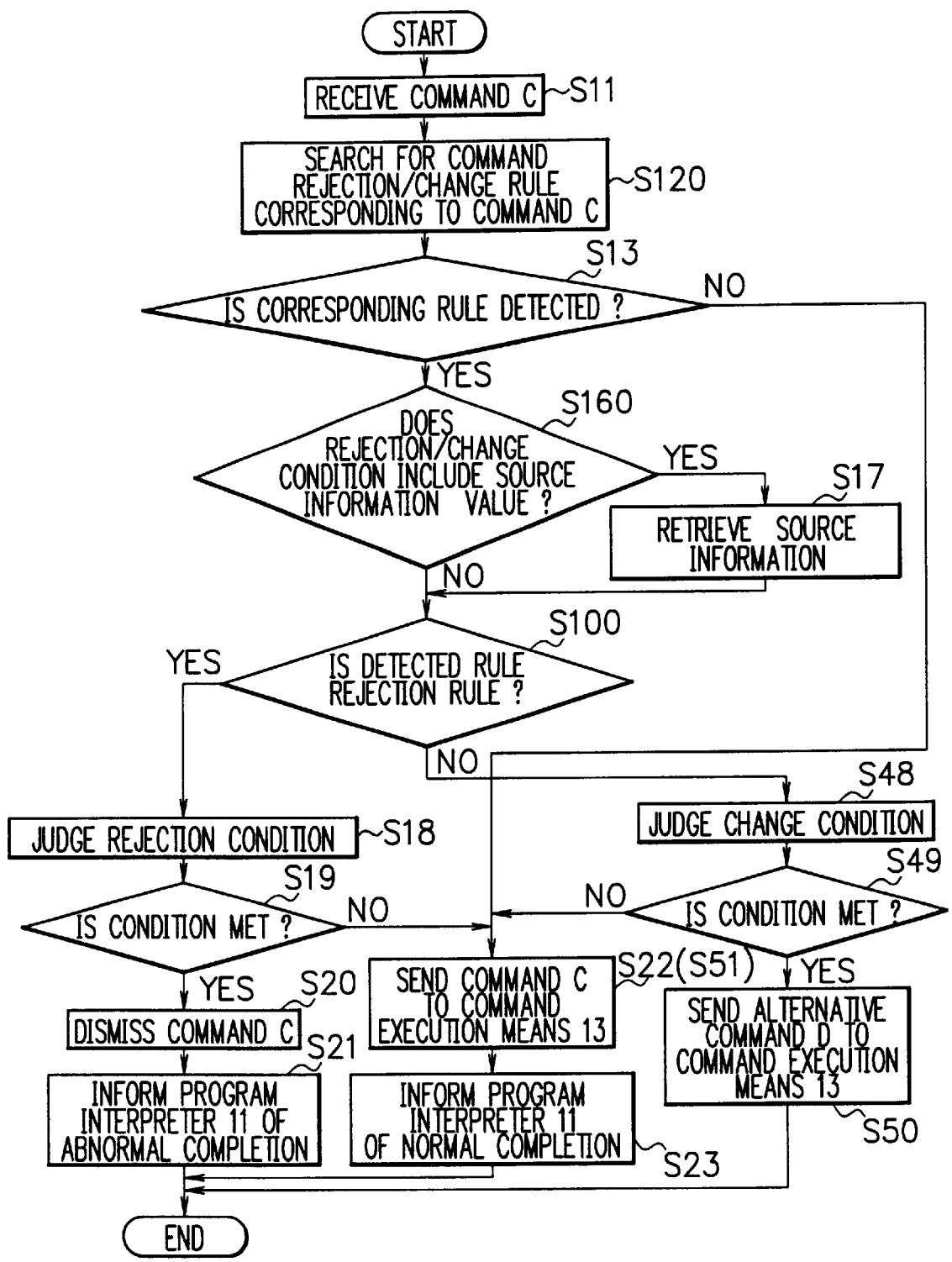
FIG. 14 is a flowchart showing the operation of the program processing unit according to the sixth embodiment of the present invention.

As shown in FIG. 14, the sensor information or execution history information is not used in this embodiment differently from the fourth and fifth embodiments. The command rejection/change means judges whether or not the rejection/change conditions are met based on the source information, and thereby achieving security features or safety functions.

The procedure of the sixth embodiment is similar to that of the fourth embodiment except that steps S34 and S35 are skipped. Accordingly, the execution history storage section and/or the sensor can be omitted from the structure of this embodiment.

As in the fourth and fifth embodiments, the operation of step S100 may be conducted immediately after step S13. In this case, when rule R is a command rejection rule (step S100/YES), the operations of steps S14 to S23 are conducted. On the other hand, when rule R is a command change rule (step S100/NO), the operations of steps S44 to S51 are conducted. Besides, the sixth embodiment is applicable to the case where both command rejection rule and command change rule correspond to a command. In this case, the command change rule is given priority at step S100, and after performing the procedure for command change, the operation returns to step S18 for judging the rejection conditions. The operations afterwards proceed in the same manner as the second embodiment.

Besides, the command rejection rule may be given priority. In this case, the procedure for command rejection is performed first, and a command is changed when the command has not been rejected.

Furthermore, it is also possible to set an ordering of priority in command change rules, so that, for example, a command corresponding to the highest (lowest) priority rule is to be rejected, and command change rules are applied to other commands. An area for storing both command rejection rules and command change rules can be provided in a storage by setting such ordering of priority with threshold values.

As set forth hereinabove, the first effect of the present invention is that execution of even an unknown program is not simply restricted, but can be adjusted to its execution environment. This is because the execution is controlled by using sensor information during execution in addition to the source information of the program.

The second effect is that it is possible to restrict execution of a program, by which certain operation is repeated and thus causing damage to a robot and other equipment. This is because command execution history can be designated as a condition for limiting the execution.

While the preferred embodiments of the present invention have been described using specific terms, such description is for illustrative purposes only, and it is to be understood that changes and variations may be made without departing from the spirit or the scope of the following claims.

What is claimed is:

1. A robot program executing method provided with a command unit for issuing a command to a robot, a storage for storing information, an input unit for inputting information from the outside to the storage, a processing unit for executing a program, and an actuator that operates with a control signal from the processing unit, wherein:

the processing unit includes a program processing unit for executing a program inputted from the outside;

the program includes a command for actuating the actuator;

the command may include one or more parameters for designating the speed, distance and/or count;

the storage includes at least an area for storing the program, an area for storing command rejection rules for rejecting execution of commands and/or command change rules for changing commands, and an area for storing source information of the program;

the command rejection rule includes a command to be rejected and conditions for judging whether or not to reject the command;

the command change rule includes a command to be replaced or modified, conditions for judging whether or not to change the command, and an alternative command; and the conditions may include conditions concerning the source information of the program, the command and parameters; for executing the command in the program, the method comprising:

searching for a command rejection rule and/or command change rule corresponding to the command;

if the rule is detected, retrieving the source information of the active program from the storage;

judging conditions included in the command rejection rule and/or command change rule using the information;

dismissing the command or changing at least a part of the command when the conditions are satisfied; and executing the command when the conditions are not satisfied.

2. The robot program executing method as claimed in claim 1, provided with one or more sensors for obtaining conditions outside the program processing unit and/or conditions of the unit, wherein the conditions may further include conditions concerning information inputted from the sensor; for executing a command in the program, the method comprising:

searching for a command rejection rule and/or command change rule corresponding to the command;

if the rule is detected, retrieving the source information and the information inputted from the sensor;

judging conditions included in the command rejection rule and/or command change rule using the information;

dismissing the command or changing at least a part of the command when the conditions are satisfied; and executing the command when the conditions are not satisfied.

3. The robot program executing method as claimed in claim 2, wherein the storage further includes an area for storing command execution history, wherein the conditions may further include conditions concerning the command execution history; for executing a command in the program, the method comprising:

searching for a command rejection rule and/or command change rule corresponding to the command;
  if the rule is detected, retrieving the source information, sensor information and command execution history from the storage;
  judging conditions included in the command rejection rule and/or command change rule using the information;
  dismissing the command or changing at least a part of the command when the conditions are satisfied; and
  executing the command when the conditions are not satisfied.

4. The robot program executing method as claimed in claim 1, wherein the storage further includes an area for storing command execution history, wherein the conditions may further include conditions concerning the command execution history; for executing a command in the program, the method comprising:

searching for a command rejection rule and/or command change rule corresponding to the command;
  if the rule is detected, retrieving the source information and command execution history from the storage;
  judging conditions included in the command rejection rule and/or command change rule using the information;
  dismissing the command or changing at least a part of the command when the conditions are satisfied; and
  executing the command when the conditions are not satisfied.

5. An robot system comprising a command unit for issuing a command to a robot, a storage for storing information, an input unit for inputting information from the outside to the storage, a processing unit for executing a program, and an actuator that operates with a control signal from the processing unit, wherein:

the processing unit include a program processing unit for executing a program inputted from the outside;
  the program includes a command for the actuator;
  the command may include one or more parameters for designating the speed, distance and/or count;
  the storage includes at least an area for storing the program, an area for storing command rejection rules for rejecting execution of commands and/or command change rules for changing commands, and an area for storing source information of the program;
  the command rejection rule includes a command to be rejected and conditions for judging whether or not to reject the command;
  the command change rule includes a command to be replaced or modified, conditions for judging whether or not to change the command, and an alternative command; and
  the conditions include conditions concerning at least one selected from the source information of the program, the command and parameters; for executing a command in the program, the robot system performing the procedural steps of:
    searching for a command rejection rule and/or command change rule corresponding to the command;
    if the rule is detected, retrieving the source information of the active program from the storage;
    judging conditions included in the command rejection rule and/or command change rule based on the source information;
    dismissing the command or executes the alternative command in the command change rule when the conditions are satisfied; and
    executing the command when the conditions are not satisfied.

6. A program processing unit comprising a command unit for issuing a command to a robot, a storage for storing information, an input unit for inputting information from the outside to the storage, a processing unit for executing a program, and an actuator that operates with a control signal from the processing unit, wherein the processing unit includes:

a program interpreter for reading a program from the storage and extracting commands;
  a command rejection means for judging whether or not to reject a command and dismissing the command when the command is determined to be rejected and/or command change means for judging whether or not to change a command and replacing at least a part of the command by an alternative command when the command is determined to be changed;
  a command execution means for executing the command or alternative command; and wherein:
    the command rejection means and/or command change means searches for a command rejection rule including at least conditions for judging whether or not to reject the command and/or command change rule including at least conditions for judging whether or not to change the command and the alternative command for replacing at least a part of the command corresponding to the command; if the rule is detected, retrieves source information of the active program from the storage; judges conditions included in the command rejection rule and/or command change rule using the information; dismisses the command or sends the alternative command in the command change rule to the command execution means when the conditions are satisfied; and sends the command to the command execution means when the conditions are not satisfied.

7. The program processing unit as claimed in claim 6, further comprising one or more sensors for obtaining conditions outside the program processing unit and/or conditions of the unit; wherein for executing a command in the program, the command rejection means and/or command change means searches for a command rejection rule and/or command change rule corresponding to the command, and if the rule is detected, retrieves the source information and input information from the sensor.

8. The program processing unit as claimed in claim 7, wherein the storage further includes an area for storing command execution history, and for executing a command in the program, the command rejection means and/or command change means searches for a command rejection rule and/or command change rule corresponding to the command, and if the rule is detected, retrieves the source information, sensor information and corresponding command execution history.

9. The program processing unit as claimed in claim 6, wherein the storage further includes an area for storing command execution history, and for executing a command in the program, the command rejection means and/or command change means searches for a command rejection rule and/or command change rule corresponding to the command, and if the rule is detected, retrieves the source information and corresponding command execution history.

* * * * *